(12) United States Patent
Brück et al.

(10) Patent No.: US 8,615,985 B2
(45) Date of Patent: Dec. 31, 2013

(54) METHOD AND DEVICE FOR PROVIDING A GAS FLOW CONTAINING A REDUCING AGENT

(75) Inventors: Rolf Brück, Bergisch Gladbach (DE); Peter Hirth, Rösrath (DE); Thomas Härig, Neunkirchen-Seelscheid (DE); Marc Brugger, Neunkirchen (DE)

(73) Assignee: EMITEC Gesellschaft fuer Emissions Technologies mbH, Lohmar (DE)

( * ) Notice: Subject to any disclaimer, the term of this patent is extended or adjusted under 35 U.S.C. 154(b) by 507 days.

(21) Appl. No.: 12/416,364

(22) Filed: Apr. 1, 2009

(65) Prior Publication Data
US 2009/0223211 A1 Sep. 10, 2009

Related U.S. Application Data

(63) Continuation of application No. PCT/EP2007/059783, filed on Sep. 17, 2007.

(30) Foreign Application Priority Data

Oct. 2, 2006 (DE) .......... 10 2006 047 019

(51) Int. Cl.
*F01N 3/00* (2006.01)
*F01N 3/10* (2006.01)
*F01N 3/04* (2006.01)

(52) U.S. Cl.
USPC .......... 60/286; 60/297; 60/299; 60/310; 60/320

(58) Field of Classification Search
USPC .......... 60/286, 297, 299, 310, 320
See application file for complete search history.

(56) References Cited

U.S. PATENT DOCUMENTS

| | | |
|---|---|---|
| 5,282,355 A | 2/1994 | Yamaguchi |
| 6,077,491 A | 6/2000 | Cooper et al. |
| 6,361,754 B1 * | 3/2002 | Peter-Hoblyn et al. .... 423/213.2 |
| 6,399,034 B1 | 6/2002 | Weisweiler |
| 6,613,292 B1 * | 9/2003 | Huthwohl et al. ............ 422/172 |
| 6,895,747 B2 | 5/2005 | Upadhyay et al. |

(Continued)

FOREIGN PATENT DOCUMENTS

| | | |
|---|---|---|
| DE | 4038054 A1 | 6/1992 |
| DE | 19720209 C1 | 6/1998 |

(Continued)

OTHER PUBLICATIONS

Mueller, et al., "Selektive Katalytische Nox-Reduktion Im Dieselmotorenabgas Unter Verwendung Von Trockenem Harnstoff Selective Catalytic Nox-Reduction in the Exhaust of Diesel Engines by Use of Solid Urea," Aachener Kolloquium Fahrzeug-Und Motorentechnik, vol. 1, Oct. 7, 2002, pp. 313-326, Germany, XP001131092.

(Continued)

*Primary Examiner* — Thomas Denion
*Assistant Examiner* — Brandon Lee
(74) *Attorney, Agent, or Firm* — Laurence A. Greenberg; Werner H. Stemer; Ralph E. Locher

(57) ABSTRACT

A method for providing a reducing agent-containing gas flow in the exhaust system of an internal combustion engine includes providing at least one reducing agent precursor, evaporating the precursor to provide a gas flow, at least partially heating the gas flow to temperatures of at least 250° C., at least partially converting the precursor in the gas flow to a reducing agent and adding the reducing agent-containing gas flow to the exhaust of the engine. The method and a device provide a reducing agent-containing gas flow in a quantity being easily controllable and adaptable to dynamic changes especially in exhaust systems of mobile applications such as automobiles. A temperature of a first zone is kept at 150° C. or just below while a temperature of a second zone is kept at more than 300° C. A hydrolysis catalytic converter is hardly cooled upon receiving the precursor as a vapor, positively affecting the method.

12 Claims, 3 Drawing Sheets

(56) References Cited

U.S. PATENT DOCUMENTS

| | | |
|---|---|---|
| 6,928,807 B2 | 8/2005 | Jacob et al. |
| 7,178,329 B2 * | 2/2007 | Bertiller et al. .................. 60/286 |
| 7,220,395 B2 * | 5/2007 | Cooper et al. .................. 423/235 |
| 7,294,313 B2 * | 11/2007 | Jacob et al. .................. 422/148 |
| 7,770,383 B2 * | 8/2010 | Kaefer et al. .................. 60/286 |
| 2003/0101714 A1 * | 6/2003 | Huthwohl et al. .............. 60/286 |
| 2003/0234011 A1 * | 12/2003 | Breuer et al. .................. 123/575 |
| 2004/0040288 A1 | 3/2004 | Jacob et al. |
| 2004/0115110 A1 | 6/2004 | Ripper et al. |
| 2005/0274108 A1 | 12/2005 | Schulte et al. |
| 2008/0314027 A1 * | 12/2008 | Barber et al. .................. 60/286 |
| 2009/0324453 A1 * | 12/2009 | Harinath et al. .............. 422/171 |

FOREIGN PATENT DOCUMENTS

| | | |
|---|---|---|
| DE | 10348800 A1 | 6/2004 |
| DE | 10308257 A1 | 9/2004 |
| DE | 10342003 A1 | 3/2005 |
| EP | 1338562 A1 | 8/2003 |
| JP | 6277449 A | 10/1994 |
| JP | 11319483 A | 11/1999 |
| JP | 2000026834 A | 1/2000 |
| JP | 2002004840 A | 1/2002 |
| JP | 2004000867 A | 1/2004 |
| JP | 2004313917 A | 11/2004 |
| JP | 2006076877 A | 3/2006 |
| WO | 0030733 A1 | 6/2000 |
| WO | 03039718 A1 | 5/2003 |
| WO | 2004073840 A1 | 9/2004 |

OTHER PUBLICATIONS

International Search Report dated Jan. 3, 2008.
International Search Report dated Apr. 4, 2003.

* cited by examiner

METHOD AND DEVICE FOR PROVIDING A GAS FLOW CONTAINING A REDUCING AGENT

CROSS-REFERENCE TO RELATED APPLICATION

This is a continuation, under 35 U.S.C. §120, of copending International Application No. PCT/EP2007/059783, filed Sep. 17, 2007, which designated the United States; this application also claims the priority, under 35 U.S.C. §119, of German Patent Application DE 10 2006 047 019.2, filed Oct. 2, 2006; the prior applications are herewith incorporated by reference in their entirety.

BACKGROUND OF THE INVENTION

Field of the Invention

The present invention relates to a method and a device for producing a gas flow containing at least one reducing agent, in the exhaust system of an internal combustion engine. The method and device may preferably be used for the provision of a reducing agent for the selective catalytic reduction of nitrogen oxides in the exhaust system of internal combustion engines, such as for example in automobiles. In such a case, the preferred reducing agent is ammonia ($NH_3$), which is provided, for example, on the basis of urea.

In many countries, the emission of certain constituents of exhaust gases of internal combustion engines is not desired. In order to keep the emissions of those constituents as low as possible, use is made in many countries of emissions standards which must be adhered to during the operation of an internal combustion engine. An example of undesired constituents of the exhaust gases are nitrogen oxides ($NO_x$), the emission of which can be reduced firstly through the use of engine-internal measures, such as for example a suitable engine construction and suitable operation of the internal combustion engine, and secondly through the use of exhaust-gas aftertreatment. One possibility for reducing the nitrogen oxide proportion in the exhaust gas of internal combustion engines is the use of selective catalytic reduction, in which at least a part of the nitrogen oxides in the exhaust gas of the internal combustion engine is converted by using a reducing agent which acts selectively on nitrogen oxides.

A reducing agent precursor such as for example urea, from which the reducing agent is produced as required, is often used for the supply or provision of the reducing agent. In that case, it is necessary for the reducing agent to be provided in the most dynamic and effective manner possible as a function of the dynamics of the nitrogen oxide proportion in the exhaust gas of the internal combustion engine.

SUMMARY OF THE INVENTION

It is accordingly an object of the invention to provide a method and a device for providing a gas flow containing a reducing agent, which overcome the hereinafore-mentioned disadvantages of the heretofore-known methods and devices of this general type, which can be effectively regulated and which permit an efficient provision of reducing agent.

With the foregoing and other objects in view there is provided, in accordance with the invention, a method for providing a reducing-agent-containing gas flow in the exhaust system of an internal combustion engine. The method comprises the following steps:

A) providing at least one reducing agent precursor;
B) evaporating the at least one reducing agent precursor to form a gas flow;
C) at least partially heating the gas flow to temperatures of at least 250° C.;
D) at least partially converting the reducing agent precursor in the gas flow into a reducing agent; and
E) adding the reducing-agent-containing gas flow to the exhaust gas of the internal combustion engine.

In this case, a reducing agent is to be understood in particular to mean a reducing agent for selective catalytic reduction, which would follow after step E) with a corresponding method. The preferred reducing agent is ammonia. A reducing agent precursor is to be understood to mean a substance which can react to form a reducing agent or which can cleave a reducing agent. An evaporation of the at least one reducing agent precursor is to be understood in particular to mean a complete evaporation of the reducing agent precursor. A complete evaporation of the reducing agent precursor is to be understood in particular to mean an evaporation in which more than 90%, preferably more than 95% and particularly preferably more than 98%, of the reducing agent precursor is evaporated.

The provision of the at least one reducing agent precursor in step A) may take place either in the form of a solid reducing agent precursor or in the form of a solution of at least one reducing agent precursor. In this case, the provision of the at least one reducing agent precursor preferably takes place in the form of a solution of urea in water, if appropriate with the addition of further reducing agent precursors or of substances which lower the freezing point of the solution.

At least partial heating of the gas flow is also to be understood in particular to mean multi-stage heating, such that heating takes place firstly to a first temperature and then, in a second stage, to a second temperature which is greater than the first temperature.

An advantage of the procedure according to the invention is, for example, that the reducing agent is generated outside the exhaust system. This generates considerably improved dynamics, since the transportation of the reducing agent is not dependent on the instantaneous exhaust-gas volume flow. Furthermore, the method according to the invention advantageously ensures separate transportation, since the actual transportation of the reducing-agent-containing gas flow takes place substantially through the use of the evaporation and the change in volume generated thereby.

In accordance with another advantageous mode of the method of the invention, step D) takes place in a time period between step B) and step E).

In particular, step D) may take place at least partially at the same time as step C) in the form of an at least partial thermolysis of the reducing agent precursor to form reducing agent. Furthermore, it is alternatively or additionally preferably possible for an at least partial hydrolysis of the reducing agent precursor to form reducing agent to take place outside the exhaust system, that is to say before step E). For this purpose, it is possible in particular for a hydrolysis catalytic converter to be provided outside the exhaust line but in such a way that it can be traversed by the at least one reducing-agent-precursor-containing gas flow. Due to the further heating in step C), very effective control and a high level of conversion effectiveness are obtained in the hydrolysis at the catalytic converter since, in step C), a temperature is preferably reached which is greater than or equal to the light-off temperature of the hydrolysis catalytic converter. The supplied reducing-agent-precursor-containing gas flow therefore does not cause the hydrolysis catalytic converter to be cooled in this case. It is preferably possible after the end of the coldstart phase of the system for further heating of the hydrolysis catalytic converter, which is additionally possible, to be dispensed with.

In accordance with a further advantageous mode of the method of the invention, step D) encompasses at least one of the following processes:
 a) an at least partially hydrolysis of the reducing agent precursor and/or
 b) an at least partial thermolysis of the reducing agent precursor.

In accordance with an added advantageous mode of the method of the invention, step B) takes place at a temperature of 180° C. or lower.

In this case, it is particularly preferable for the temperature to be controlled in such a way that the temperature lies in a range of from 140 to 170° C. It is also preferable for the method to be implemented in such a way that the temperature in step B) is in a range of from 140 to 150° C., and is preferably less than 153° C., since it has been found that the deposition of undesired byproducts is relatively low if the method is implemented in this way.

In accordance with an additional advantageous mode of the method of the invention, in step C), heating takes place to temperatures of 250° C. to 550° C.

In particular, temperatures of 350 to 450° C. have proven to be particularly advantageous since, with such a temperature range, only very slight depositions have been observed in the component used for carrying out step C).

In accordance with yet another advantageous mode of the method of the invention, step A) includes at least one of the following procedures:
 a) the transportation of a solution of at least one reducing agent precursor in aqueous solution into a first zone of a duct, in which step B) is carried out;
 b) the quasi-continuous transportation of at least parts of a solid matter strand including at least one reducing agent precursor into a first zone of a duct, in which step B) is carried out; and
 c) adding at least one solid matter particle including at least one reducing agent precursor into a first zone of a duct, in which step B) is carried out.

The solution of at least one reducing agent precursor is in particular an aqueous solution, preferably of urea. Such a solution is marketed under the trademark "AdBlue". It is also possible for such a solution to contain further additives which for example reduce the freezing point of the solution. A solution is commercially available under the trademark "Denoxium" which, in addition to urea, also contains formic acid and/or ammonium formate. The transportation may preferably take place through the use of a pump, and it is possible for transportation to take place firstly through the use of a dosing pump or secondly through the use of a corresponding dosing valve in combination with a conventional pump.

Quasi-continuous transportation is to be understood to mean not that a predetermined quantity of the solid matter is supplied, but rather that precisely that amount which is presently required is, in a sense, melted off from the solid matter strand. In variant c), a solid matter particle is to be understood in particular to mean a pellet or prill which is melted and evaporated.

Within the context of the present invention, a duct is to be understood in particular to mean a duct or channel which is formed in a casing or in a sleeve which surrounds a rod-shaped heating element. Alternatively and/or in addition, it is also possible for the duct to have a capillary which, if appropriate, is formed together with a heat conductor and which is in particular wound in a spiral shape. It is in particular also possible for a duct to have a continuously or discontinuously varying cross section.

A reducing agent precursor is to be understood within the context of the present invention to mean a substance or a substance mixture which includes at least one of the following substances:
 a) urea $((NH_2)_2CO)$;
 b) ammonium formate $(HCOONH_4)$;
 c) ammonium carbamate $(H_2NCOONH_4)$;
 d) ammonium carbonate $((NH_4)_2CO_3)$;
 e) ammonium bicarbonate $(NH_4HCO_3)$;
 f) ammonium oxalate $((NH_4)_2(C_2O_4))$;
 g) ammonium hydroxide $(NH_4OH)$;
 h) cyanic acid $(HOCN)$;
 i) cyanuric acid $(C_3H_3N_3O_3)$; and
 j) isocyanic acid $(HNCO)$.

A reducing agent precursor may also be a derivative of at least one of the substances specified above.

With the objects of the invention in view, there is also provided a device for providing a reducing-agent-containing gas flow in the exhaust gas of an internal combustion engine. The device comprises:
 a transportation device for providing at least one reducing agent precursor in at least one duct having at least one first zone for the at least partial evaporation of the reducing agent precursor to form a gas flow and at least one second zone for the at least partial heating of the gas flow;
 ii) at least one device for converting the reducing agent precursor in the gas flow into at least one reducing agent; and
 iii) at least one heating element for heating the first zone to a first temperature and for heating the second zone to a second temperature.

In this case, the second temperature lies above the first temperature. The first temperature preferably lies in the range of 180° C. or lower, preferably in the range of from 140 to 170° C., particularly preferably in the range of from 140 to 150° C., and is preferably less than 153° C. The second temperature is at least 250° C., and lies in particular in the range from 250° C. to 550° C., in particular in the range of from 350° C. to 450° C.

The duct preferably has, at least in regions and in particular in the region of the second zone, a catalytic coating which catalyzes the hydrolysis of reducing agent precursor to form reducing agent, for example of urea to form ammonia.

The device according to the invention advantageously permits a highly dynamic provision of reducing agent in the form of a reducing-agent-containing gas flow, which is used in particular in a hydrolysis catalytic converter that may possibly be provided and which may be at least a part of the device for converting the reducing agent precursor. A coating which catalyzes a hydrolysis of reducing agent precursor to form reducing agent may in particular be a coating which has $Al_2O_3$, $TiO_2$, $SiO_2$ and/or $ZrO_2$ as catalytically active substances.

In accordance with another advantageous feature of the device of the invention, the transportation device includes at least one of the following components:
 a) a device for the transportation of a solution of at least one reducing agent precursor in a fluid;
 b) a device for the quasi-continuous transportation of a solid matter which includes at least one reducing agent precursor; and
 c) a device for the discontinuous transportation of a solid matter including at least one reducing agent precursor.

In this context, quasi-continuous transportation is to be understood in particular to mean not that a defined quantity of the solid matter is provided, as is the case for example with discontinuous transportation, but rather that precisely that proportion of the solid matter which corresponds to the presently required quantity of reducing agent is melted off and evaporated.

In accordance with a further advantageous feature of the device of the invention, the device for converting the reducing agent precursor is at least partially included in the second zone.

In accordance with an added advantageous feature of the device of the invention, the second zone includes a hydrolysis catalyst coating at least in partial regions.

In accordance with an additional advantageous feature of the device of the invention, at least one hydrolysis catalytic converter is provided.

In addition to a coating which catalyzes the hydrolysis of a reducing agent precursor to form reducing agent, for example in the region of the second zone of the duct, it is also possible for a hydrolysis catalyst coating to be provided in some other region, or else for a honeycomb body with a corresponding coating or with correspondingly embedded catalytically active centers to be provided. In this case, the device for converting the reducing agent is generally provided downstream of at least the first zone of the duct.

In accordance with yet another advantageous feature of the device of the invention, at least one of the following zones:
a) the first zone and/or
b) the second zone
includes a heatable duct.

In particular, it is possible for the heating to be provided through the use of an electrical resistance heater, a continuous burner and/or through the use of a Peltier element. In this case, it is preferable for an electrical resistance heater to be used, particularly preferably a self-regulating electrical resistance heater, which may be realized, for example, through the use of PTC (positive temperature coefficient) resistors. In particular, at least two heating zones are provided, the nominal temperatures of which correspond to the first and second temperatures. That is to say, that the nominal temperatures are selected in such a way that the corresponding first and second temperatures are present in the medium in the first zone and in the second zone.

In accordance with yet a further advantageous feature of the device of the invention, the first and second zones are part of a heatable duct.

During operation, the first zone is then firstly supplied with the reducing agent precursor in solution and/or as solid matter, which reducing agent precursor is evaporated there in the first zone. The gas generated in this way then flows through the second zone of the duct.

In accordance with a concomitant advantageous feature of the device of the invention, the duct has a smaller cross section in the region of the first zone than in the region of the second zone.

The traversable cross section is therefore larger in the region of the second zone than in the first zone. This makes allowance for the evaporation of the reducing agent precursor, with the associated increase in volume. The ratio of the cross section of the second zone to the cross section of the first zone lies in particular in the range of from 1 to 3. The ratio of the duct surface area of the second zone to the duct surface area of the first zone is preferably approximately 0.3 to 0.6, preferably approximately 0.5. The surface of the first zone is preferably 0.4 square meters, preferably 0.1 square meters or less, particularly preferably less than 0.05 square meters, such as in particular approximately 0.02 square meters. The surface area of the second zone is preferably 0.2 square meters, preferably 0.05 square meters or less, particularly preferably less than 0.025 square meters, such as in particular approximately 0.01 square meters. The maximum power density which can be introduced in the first zone is at most 50 W/cm$^2$ (Watts per square centimeter), preferably at most 5 Watts per square centimeter. The maximum power density which can be introduced in the second zone is at most 50 Watts per square centimeter, preferably at most 15 Watts per square centimeter. The zones are configured in particular in such a way that the quotient of the maximum power density which can be introduced in the first zone to the maximum power density which can be introduced in the second zone is approximately 3. These values have proven to be particularly advantageous since the formation of undesired byproducts, which can possibly lead to a blockage of the duct, is prevented with such values.

The underlying concept of the present invention is the two-stage heating of the reducing agent precursor, in particular of an aqueous urea solution, with an evaporation of the aqueous urea solution or of the reducing agent precursor taking place in the first stage and with further heating of the vapor which is thereby generated taking place in the second stage, possibly with an already-incipient partial thermolysis of the reducing agent precursor to form reducing agent. The length of the region or of the first zone or, more generally, of the zone in which the evaporation of the reducing agent precursor takes place is dependent on the quantity of reducing agent precursor to be evaporated. The greater the quantity of reducing agent precursor to be evaporated, the longer is the zone in which an evaporation takes place. If a single duct is provided which is divided into two zones, it is possible firstly for the length of the first and second zones to be dynamically adapted, for example by virtue of the heating elements being constructed such that a lengthening or shortening of the first zone, and a corresponding shortening or lengthening of the second zone, can take place. Another alternative is for the duct to be divided into the first and second zones in such a way that, for a certain quantity of reducing agent precursor to be evaporated, the transition from the first to the second zone takes place at precisely the point which corresponds to the expected length of the zone of the evaporation for that quantity of reducing agent precursor. In particular, the division may take place at an average and/or frequently-occurring load state of the internal combustion engine, or else at full load. Therefore, in the second case, in which the border between the first and second zones is thus fixed, an evaporation of the reducing agent precursor takes place if appropriate not only in the first zone but rather also into the second zone.

The details and advantages disclosed for the method according to the invention can be transferred and applied in the same way to the device according to the invention. The details and advantages described for the device according to the invention can be transferred and applied in the same way to the method according to the invention.

Other features which are considered as characteristic for the invention are set forth in the appended claims.

Although the invention is illustrated and described herein as embodied in a method and a device for providing a gas flow containing a reducing agent, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with

DETAILED DESCRIPTION OF THE INVENTION

Figure 1:
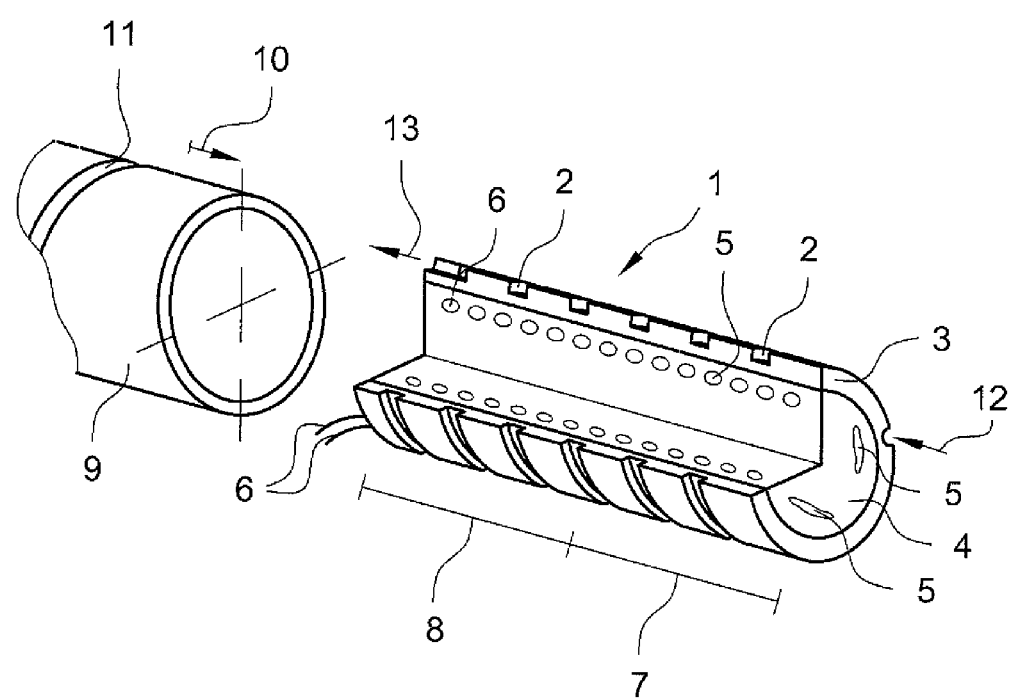
FIG. 1 is a fragmentary, diagrammatic, perspective view of a first embodiment of a device according to the invention.

Referring now to the figures of the drawings in detail and first, particularly, to FIG. 1 thereof, there is seen a diagrammatic illustration of a first exemplary embodiment of a device 1 according to the invention for providing a reducing-agent-containing gas flow. The device 1 includes a duct or channel 2 which is formed in a jacket 3. The jacket 3 surrounds a rod-shaped heating element 4. The rod-shaped heating element 4 has at least one first heat conductor 5 and one second heat conductor 6. A first zone 7 can be heated through the use of the first heat conductor 5, and a second zone 8 can be heated through the use of the second heat conductor 6. The heat conductors 5, 6 are preferably self-regulating heat conductors, such as for example PTC conductors. A sleeve 9, which is also provided, is pushed over the device in the direction of an arrow 10. The sleeve 9 has a constriction 11 which, in the assembled device 1, lies at a boundary between the first zone 7 and the second zone 8. The constriction 11 reduces the exchange of heat between the two zones 7, 8 through the sleeve 9. Further measures for reducing or preventing such exchange of heat may be provided.

During operation, a reducing agent precursor 12, preferably urea, is added in particular in the form of an aqueous urea solution, into the duct 2 and is preferably completely evaporated there in the first zone 7. A gas flow, which is then formed and which includes at least one reducing agent precursor, then flows onward through the duct 2 and is heated. In particular, the heating especially takes place at least partially in the region of the second zone 8. The gas flow 13 then leaves the duct 2. Depending on the construction of the device 1 and on the implementation of the method, the gas flow 13 includes a reducing agent precursor and/or a reducing agent, which is generated in particular in the region of the second zone 8 through the use of thermolysis. The duct 2 may, at least in partial regions of the first zone 7 and the second zone 8, have a hydrolysis catalyst coating, that is to say a coating which catalyzes the hydrolysis of the reducing agent precursor to form reducing agent.

Figure 2:
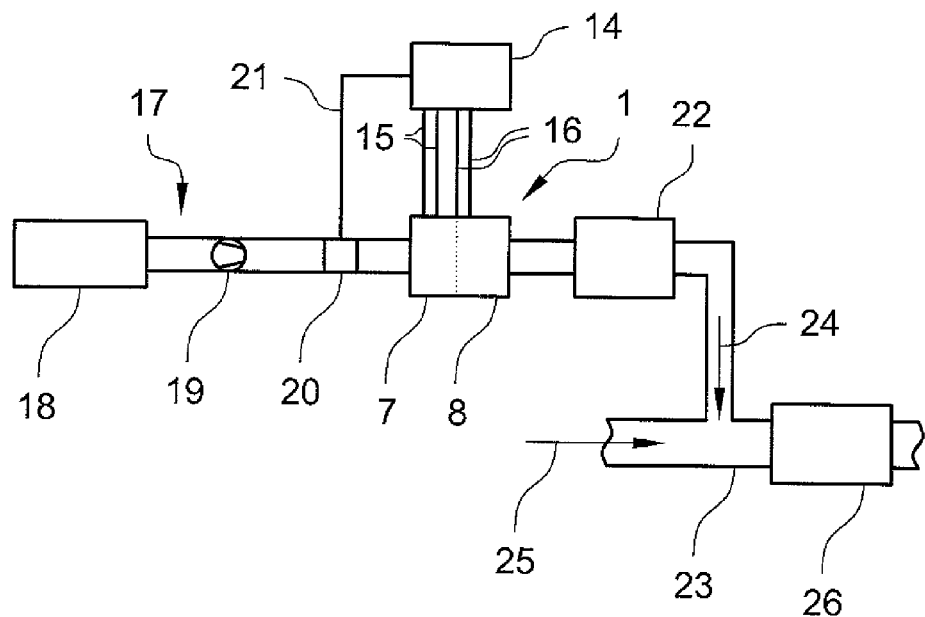
FIG. 2 is a block diagram of a second embodiment of a device according to the invention.

FIG. 2 shows a device 1 according to the invention as a part of a device for the selective catalytic reduction of nitrogen oxides in the exhaust gas of an internal combustion engine. The device 1 has a first zone 7 and a second zone 8 in this case too. The zones 7, 8 are heated by the heating devices 5, 6 (not shown in FIG. 2) which are controlled by a control device 14 that can be connected by first lines 15 to the corresponding first heat conductor 5 of the first zone 7 and by second lines 16 to the second heat conductor 6 of the second zone 8. The heating power both in the first zone 7 as well as in the second zone 8 can thus be regulated and controlled independently of one another. The control device 14 may at the same time include a voltage or current supply. If self-regulating first and second heat conductors 5, 6 are used, it is possible to dispense with the control device 14. Instead, it is possible for merely a current or voltage supply to be provided for each of the heat conductors 5, 6.

A device 17 for delivering a solution of at least one reducing agent precursor is also provided. In this exemplary embodiment, the device 17 includes a pump 19 in addition to a reservoir 18 for a solution of a reducing agent precursor. The pump 19 may for example be a dosing pump, through which in each case defined quantities of the solution are introduced into the first zone. It is also possible for the pump 19 to be constructed as a conventional pump, for example as a diaphragm pump, with a valve 20 then advantageously being provided. The supply of the solution of the reducing agent precursor to the first zone 7 is regulated through the use of the valve 20. The valve 20 may advantageously be connected through third lines 21 to the control device 14. A hydrolysis catalytic converter 22 is provided downstream of the second zone 8. During operation, an at least partial hydrolysis of the reducing agent precursor to form the reducing agent takes place in the hydrolysis catalytic converter 22. In this way, the reducing agent is generated outside an exhaust line 23. A reducing-agent-containing gas flow 24 generated in the device 1 is introduced into the exhaust line 23, where the gas flow 24 is mixed with an exhaust-gas flow 25 of an internal combustion engine. The mixture of the two gas flows then flows through an SCR catalytic converter 26, in which nitrogen oxides contained in the exhaust-gas flow 25 are converted with the reducing agent. A gas flow having an $NO_x$ content which has been reduced then leaves the SCR catalytic converter 26.

Figure 3:
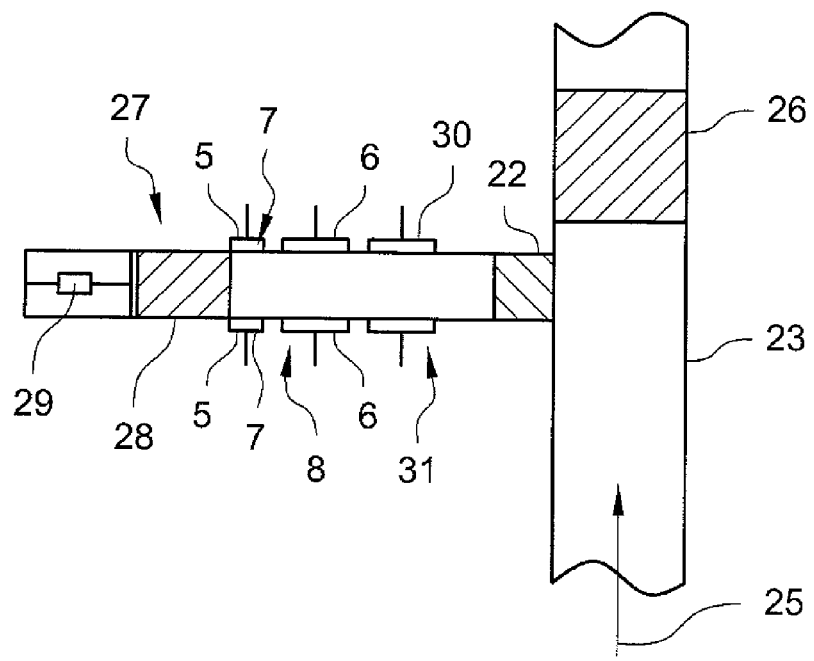
FIG. 3 is a partly-sectional, elevational view of a third embodiment of a device according to the invention.

FIG. 3 diagrammatically shows a further exemplary embodiment of the device 1 according to the invention. In this case, a reducing agent precursor solution is not evaporated. Instead, a device 27 for the quasi-continuous transportation of at least one reducing agent precursor as solid matter 28 is provided. In this case, a type of strand of the reducing agent precursor 28 or of a solid matter 28 including a reducing agent precursor is pressed into a first zone 7. This takes place, for example, through the use of a hydraulic cylinder 29 which can be controlled correspondingly. The reducing agent precursor 28 is melted, with simultaneous or subsequent evaporation, in the first zone 7 having the first heating element 5. The vapor which is generated in this way is heated further in the second zone 8, which is heated by the second heating element 6. Heating to an even higher temperature takes place in a third zone 31 which includes a third heat conductor 30. The gas mixture which is generated then flows through the hydrolysis catalytic converter 22. Depending on the make up of the solid matter 28 which includes the reducing agent precursor, it may be necessary for water to also be provided in the hydrolysis catalytic converter 22. This may take place, for example, by introducing a certain amount of exhaust-gas flow upstream of the hydrolysis catalytic converter or else through the use of the simultaneous evaporation of water, for example of condensation water. The hydrolysis catalytic converter 22 is optional, in particular if the temperatures of the first zone 7, second zone 8 and third zone 31 are selected in such a way that a substantially complete thermolysis of the reducing agent precursor to form ammonia takes place.

In the present embodiment, the hydrolysis catalytic converter 22 is flange-mounted directly onto the exhaust line 23 at right angles. After infiltrating into the exhaust line 23, the exhaust-gas flow 25, which is then enriched with reducing agent, then flows through the SCR catalytic converter 26. An exhaust-gas flow having a nitrogen oxide content which has been reduced in relation to the exhaust-gas flow upstream of the SCR catalytic converter 26, then leaves the SCR catalytic converter 26.

Figure 4:
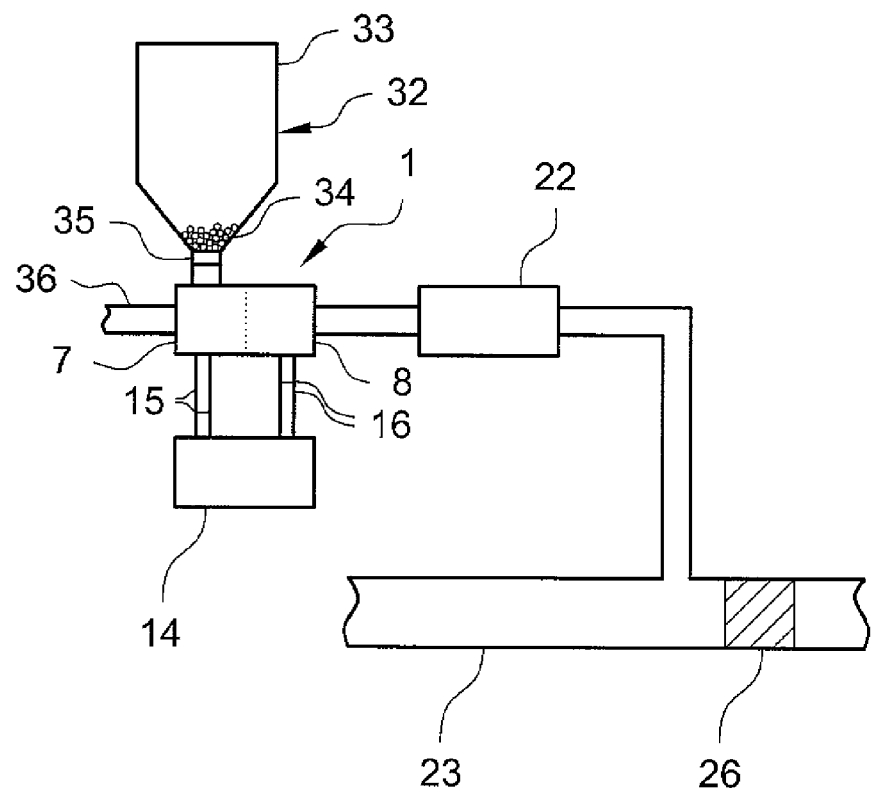
FIG. 4 is a block diagram of a fourth embodiment of a device according to the invention.

FIG. 4 diagrammatically shows a further embodiment of a device 1 according to the invention as a part of a device for the selective catalytic reduction of nitrogen oxides in the exhaust gas of an internal combustion engine. In contrast to the embodiments discussed above, this exemplary embodiment has a device 32 for the discontinuous transportation of a solid matter which includes a reducing agent precursor. The device 32 includes a reservoir 33 which stores solid matter particles 34 that include at least one reducing agent precursor, such as for example urea pellets. A separating device 35 is provided between the reservoir 33 and the first zone 7. It can be ensured through the use of the separating device 35 that during operation only one solid matter particle 34 passes into the first zone 7. In this embodiment, the device 1 optionally also has a further supply line 36, through which a water-containing gas can be supplied. The water-containing gas may be used to promote the hydrolysis in the hydrolysis catalytic converter 22.

Figure 5:
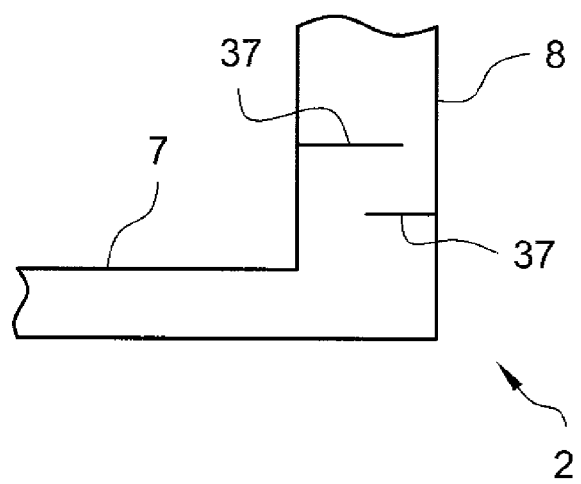
FIG. 5 is a fragmentary, elevational view of a duct in a device according to the invention.

FIG. 5 diagrammatically shows a portion of a duct 2. The duct 2 has a first zone 7 with a first cross section and a second zone 8 with a second cross section. The cross section of the second zone 8 is larger than the cross section of the first zone 7. Furthermore, the duct 2 includes fittings 37 which act as a type of impact plate and which ensure that no droplets, resulting from an incomplete evaporation in the first zone, pass through the second zone 8, but that such droplets instead impact against the fittings 37. It is generally advantageous to provide at least one change in direction of the gas flow in the second zone 8, for example through the use of deflections, duct radius constrictions, fittings or the like.

The method according to the invention and the device 1 according to the invention advantageously permit the provision of a reducing-agent-containing gas flow 13, the quantity of which can be controlled in a simple manner and can be adapted to dynamic changes in situation as often occur in particular in the exhaust-gas system of mobile applications, such as for example in automobiles. It has been proven to be advantageous in particular for the method to be implemented in such a way that the temperature of the first zone 7 is held at approximately 150° C. or slightly lower, while the temperature of the second zone 8 is held at over 300° C. As a result of the supply of the reducing agent precursor in the form of vapor to the hydrolysis catalytic converter 22, the hydrolysis catalytic converter 22 experiences virtually no cooling, such that the implementation of the method is positively influenced in this case as well.

The invention claimed is:

1. A method for providing a reducing-agent-containing gas flow in the exhaust system of an internal combustion engine, the method comprising the following steps:
    A) providing at least one reducing agent precursor as a liquid, a solid or a urea water solution;
    B) evaporating the at least one reducing agent precursor in a first stage at a first temperature of 180° C. or lower in a first zone of a duct to form a gas flow;
    C) at least partially heating the gas flow in a second stage following the first stage to a second temperature of 250-550° C. in a second zone of the duct;
    C') introducing the at least one reducing agent precursor alone into the first zone and conducting the at least one reducing agent precursor through the first zone and the second zone without mixing with any other substance;
    D) at least partially converting the reducing agent precursor in the gas flow into a reducing agent downstream of the first zone, in or after the second stage and in or downstream of the second zone to form the reducing-agent-containing gas flow; and
    E) adding the reducing-agent-containing gas flow to the exhaust gas of the internal combustion engine.

2. The method according to claim 1, which further comprises carrying out step D) in a time period between step B) and step E).

3. The method according to claim 1, which further comprises carrying out at least one of the following processes in step D):
    a) an at least partial hydrolysis of the reducing agent precursor; or
    b) an at least partial thermolysis of the reducing agent precursor.

4. The method according to claim 2, which further comprises carrying out at least one of the following processes in step D):
    a) an at least partial hydrolysis of the reducing agent precursor; or
    b) an at least partial thermolysis of the reducing agent precursor.

5. The method according to claim 1, which further comprises carrying out the following measure in step A):
    transporting a solution of at least one reducing agent precursor in aqueous solution into the first zone in which step B) is carried out, in the duct.

6. The method according to claim 1, which further comprises carrying out the heating in step C) to temperatures of 350° C. to 450° C.

7. A device for providing a reducing-agent-containing gas flow in the exhaust gas of an internal combustion engine, the device comprising:
    i) at least one duct including at least one first zone configured for at least partial evaporation of at least one reducing agent precursor to form a gas flow in a first stage and at least one second zone configured for at least partial heating of the gas flow in a second stage following said first stage, said at least one duct configured to receive the at least one reducing agent precursor alone in said first zone and to conduct the at least one reducing agent precursor through said first zone and said second zone without mixing with any other substance;
    ii) a transportation device configured for providing the at least one reducing agent precursor as a liquid, a solid or a urea water solution in said at least one duct;
    iii) at least one converter disposed downstream of at least said first zone and configured for converting the reducing agent precursor in the gas flow into at least one reducing agent; and
    iv) at least one heater for heating said first zone to a first temperature of 180° C. or lower and for heating said second zone to a second temperature of 250-550° C.;
    said at least one duct and said at least one converter configured to convert the reducing agent precursor to form reducing agent in or after said second stage and in or downstream of said at least one second zone.

8. The device according to claim 7, wherein said transportation device includes a pump for a fluid.

9. The device according to claim 7, wherein said at least one converter configured for converting the reducing agent precursor is at least partially included in said second zone.

10. The device according to claim 7, which further comprises at least one hydrolysis catalytic converter.

11. The device according to claim 7, wherein said duct has a smaller cross section in a region of said first zone than in a region of said second zone.

12. The device according to claim 7, wherein said at least one heater is configured for heating said first zone to said first temperature of 180° C. or lower and for heating said second zone to said second temperature of 350° C. to 450° C.

* * * * *